Patented Dec. 24, 1946

2,413,255

UNITED STATES PATENT OFFICE 2,413,255

PROCESS FOR REFINING STYRENE AND METHYL STYRENE

Frank J. Soday, Baton Rouge, La., assignor to The United Gas Improvement Company, a corporation of Pennsylvania No Drawing. Application May 17, 1943, Serial No. 487,345

7 Claims. (Cl. 260—669)

This invention relates to the refining of styrene-type compounds.

More particularly, this invention pertains to the removal of impurities from styrene and substituted styrene by the application thereto of one or more metals of group Ia and group IIa of the periodic table, as well as certain active alloys thereof.

An object of the present invention is the removal of certain impurities from styrene and substituted styrene by treatment with one or more finely divided alkali or alkaline earth metals, or active alloys thereof. Another object of the invention is the provision of certain methods whereby styrene and substituted styrene and particularly light oil styrene and substituted styrene fractions, may be purified in a continuous manner by the application of alkali or alkaline earth metals without undue loss of unsaturated hydrocarbons in the form of soluble or insoluble polymers. Other objects and advantages of the invention will be apparent to those skilled in the art upon an inspection of the following description and claims.

Styrene and substituted styrene fractions, particularly light oil fractions, frequently contain substantial quantities of impurities, such as acetylenic hydrocarbons and compounds; oxygenated compounds such as aldehydes and peroxides; sulfur compounds; and other impurities, which interfere with the use of such materials in most, if not all, industrial applications.

Thus, for example, a 60% light oil styrene fraction obtained by the pyrolysis of petroleum in the gas phase at temperatures substantially above 1300° F., followed by condensation and fractionation, was found to contain 0.2% phenyl acetylene, 0.1% sulfur, and 0.02% aldehydes, as well as certain other oxygenated impurities. This styrene fraction, as well as the more highly concentrated styrene obtained therefrom by the use of suitable concentrating methods, such as a 98% styrene concentrate, is unsuited for the production of resins of good quality due to the inhibiting action, and other undesirable properties, of the impurities contained therein.

As a result of extensive experimentation, I have discovered that styrene and substituted styrene, particularly light oil styrene and substituted styrene fractions, may be refined by the application in finely divided form of at least one metal of group Ia and group IIa of the periodic table, as well as certain active alloys thereof, in a continuous operation. Particularly desirable results are obtained by the use of finely divided alkali and alkaline earth metals.

Examples of such metals are lithium, sodium, potassium, rubidium, caesium, barium, strontium and calcium. Due to the availability and low cost of sodium and potassium, however, these metals are preferred for the use set forth herein.

Alloys of these metals, such as $NaPb_{10}$, $NaHg_4$, $NaCa_5$, $NaZn_{12}$, KNa and the like, also may be employed for the removal of undesired impurities from styrene and substituted styrene. In general, the alloys of the respective metals react with the impurities present in styrene and substituted styrene fractions at a slower rate than the corresponding metals.

In general, therefore, it may be said that very finely divided metals in groups Ia and IIa of the periodic system, and their reactive alloys, may be used to refine styrene and substituted styrene.

The styrene and substituted styrene which may be refined by this method may be obtained from any desired source such as synthetically, for example by the removal of the elements of chlorine or hydrogen chloride from chlorinated ethyl benzene or substituted ethyl benzenes; by the partial hydrogenation of certain phenyl or substituted phenyl acetylenes; by the dehydrogenation of ethyl benzene or substituted ethyl benzenes; by the dehydration of phenyl ethyl alcohol or methyl phenyl carbinol, or substituents thereof; and by the pyrolysis of petroleum or petroleum hydrocarbons in the gaseous phase at temperatures above 1000° F., and more particularly above 1300° F., followed by condensation and fractionation; and by the pyrolysis of other carbonaceous materials. Other procedures also may be employed for the production of styrene or substituted styrene which may be refined by the methods to be more particularly described herein.

The styrene fractions which may be refined by my process may have any desired boiling point, although I generally prefer to employ fractions boiling mainly in the range of 125 to 160° C., and more particularly from 140 to 150° C. Excellent results are obtained by the use of styrene fractions boiling mainly in the range of 143 to 148° C.

The substituted styrenes which may be refined by my process may be represented by the following formula

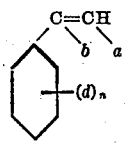

in which at least one of the group $a$, $b$, and $d$ is an alkyl group, such as methyl, ethyl, propyl, butyl, or amyl, the remaining groups being hydrogen, and $n$ denotes that from up to five of such substituents may be present on the benzene ring.

Examples of such substituted styrenes are the methyl styrenes, and particularly the nuclear-substituted methyl styrenes.

Of particular interest is the mixture of nuclear-substituted methyl styrenes obtained among other ways, by the pyrolysis of petroleum at temperatures above 1300° F. These fractions may have any desired boiling range, although I generally prefer to employ fractions boiling mainly in the range of 160 to 180° C., and more particularly in the range of 165 to 175° C. Excellent results are obtained by the use of fractions boiling mainly in the range of 167 to 173° C.

A preferred embodiment of this invention is the continuous refining of a mixture of styrene and methyl styrene, such as a light oil fraction boiling mainly in the range of 125 to 180° C., followed by the separation of the styrene and methyl styrene, if desired, and/or the concentration of the styrene and/or methyl styrene.

For convenience in the specification and claims, the term "styrene-type compound" will be used to denote styrene, substituted styrene, and mixtures thereof.

The fractions containing styrene-type compounds also may be initially concentrated to any desired extent prior to refining, and such concentration may be carried out by any desired method. This may include concentration by fractionation, azeotropic distillation, solvent extraction, a combination of solvent extraction and fractionation methods, and the formation of complexes between the diolefine and some active compound, followed by the removal of the unreacted portion of the fraction and the decomposition of the complex. Other concentrating methods also may be employed if desired.

In addition, other refining methods also may be applied to styrene-type compounds and fractions thereof to remove at least a portion of one or more impurities present prior to refining by methods to be more particularly described herein. Thus, such fractions may be contacted with acids or acidic solutions or materials to remove a portion of certain impurities or undesirable materials present.

Such concentrating and/or partial refining operations also may be applied to styrene-type compounds subsequent to the refining operations to be more particularly described herein.

I find that a solution of sodium, or a suspension or emulsion of very finely divided sodium, or a solution, suspension, or emulsion of one or more finely divided sodium alloys, is a particularly desirable agent for the continuous removal of certain undesirable impurities from styrene-type compounds. Excellent results are obtained by the use of a suspension of very finely divided sodium.

The alkali metals, particularly sodium and potassium, are very active catalysts for the polymerization of styrene-type compounds. Consequently, the use of such an active catalyst, particularly in finely divided (and hence most active) form, for the refining of styrene-type compounds would be expected to result in the conversion of the greater portion, if not all, of such compounds present to polymers.

It should be emphasized that the success of the refining operations is dependent upon rigid adherence to certain operating conditions such as temperature, reaction time, concentration, and so forth, which will be discussed in considerable detail.

In addition, the use of polymerization inhibitors, as well as the method employed for conducting the refining operations, also has a very considerable influence upon the results obtained.

While the refining operations may be carried out in the absence of any added polymerization inhibitors, I prefer to employ one or more polymerization inhibitors in order to reduce the loss of styrene-type compound in the form of polymers, as well as to broaden the permissible limits of certain of the reaction variables.

Inhibitors which are particularly effective agents for retarding the rate of polymerization of styrene-type compounds when refined with very finely divided metals in groups Ia and IIa of the periodic system, their reactive alloys, and reactive derivatives, may be classified in the following groups.

1. Amines and nitrogen-containing inhibitors, particularly aryl amines such as:

Alpha-naphthylamine,
    Thiodiaryl amines,
    p-Phenylene diamine,
    o-Phenylene diamine,
    2,4-diamino diphenylamine
    Phenyl hydrazine,
    Benzamide,
    Cyclohexyl naphthyl amine, and
    Polybutyl amines.

Particularly desirable results may be obtained by the use of secondary aryl amines having the following general formula

in which $R_1$ is a substituted or an unsubstituted aryl such as phenyl or naphthyl, aralkyl such as tolyl or methyl phenyl, cycloparaffinic such as cyclobutyl, cyclopentyl, or cyclohexyl, cycloolefinic such as cyclobutenyl, cyclopentyl, or cyclohexenyl, hydroaromatic such as dihydrophenyl, or tetrahydrophenyl, or naphthenic such as methyl cyclohexyl, ring or group, and in which $R$ is a substituted or an unsubstituted alkyl, such as, methyl, ethyl, propyl, butyl or amyl, aryl, aralkyl, cycloparaffinic, cycloolefinic, hydroaromatic, or naphthenic ring or group such as given in the case of $R_1$. Included are secondary amines such as for examples

and

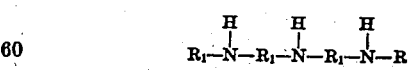

in which $R$ and $R_1$ have the same meaning as before.

Secondary amines containing one or more aryl or substituted aryl groups are preferred, such as:

Diphenyl-p-phenylene diamine,
    Phenyl-beta-naphthylamine,
    Isopropoxydiphenyl amine,
    Aldol-alpha-naphthyl amine (and polymers thereof),
    Symmetrical di beta naphthyl-p-phenylenediamine,
    Trimethyl dihydroquinoline (and polymers thereof), and
    Ditolylamines, and mixtures thereof.

2. Phenolic compounds, such as:

p-Tertiary butyl catechol,
    Dihydroxybenzenes (and substitution products thereof),
    Pyrogallol (and substitution products thereof),
    Pyrocatechol,
    Resorcinol,
    Xylenols,
    Catechol,
    Trihydroxybenzene (and substituents thereof),
    Nitrosophenol,
    Diaminophenol,
    Alpha-naphthol,
    Dihydroxynaphthalene,
    Hydroxy quinoline,
    Hydroxy tetrahydroquinoline,
    Polyhydric phenols,
    Polyhydroxy phenanthrene, and
    4-nitroso-2-methyl phenol.

3. Compound inhibitors, such as:

Acyl-substituted amino phenols,
    4-cyclohexyl amino phenol,
    p-Amino phenol,
    o-Amino phenol, and
    5-amino-2-hydroxytoluene.

4. Miscellaneous inhibitors, such as:

Hydroquinone,
    Quinol,
    Nitroso naphthols,
    Quinhydrone,
    Reaction product of an aldehyde and an amine,
    p-Amino acetophenone,
    Dihydroxy anthraquinone, and
    Reaction product of a ketone with an amine.

Excellent results may be obtained when one or more inhibitors selected from a list comprising (1) secondary aryl amines such as phenyl beta-naphthylamine, diphenyl-p-phenylene diamine, isopropoxydiphenyl amine, aldol-alpha-naphthylamine (and polymers thereof), symm. di-beta-naphthyl-p-phenylene diamine, trimethyl dihydroquinoline (and polymers thereof), and the ditolylamines; (2) phenolic compounds, such as p-tertiary butyl catechol and alkylated polyhydroxy phenols; and (3) reaction products of a ketone, such as acetone, and/or an aldehyde, such as formaldehyde and acetaldehyde, with an amine, such as aniline, are employed in the refining process described.

In general, I prefer to employ less than 10%, by weight, of polymerization inhibitor, based on the maximum total volume of suspending liquid in the treating system at any one time in the continuous treating system. Good results also have been obtained by the use of less than 5% inhibitor, and even less than 2% inhibitor, in certain cases, particularly when one or more of the inhibitors listed in the preceding paragraph are employed.

As pointed out previously, the refining operations are carried out in a continuous or semi-continuous system in order to reduce the proportion of styrene-type compound lost in the form of polymers, as well as to secure greater economy in the use of the reagent.

The refining method disclosed herein differs fundamentally from all methods described heretofore for the refining of styrene-type compounds in that the material in question is treated with a metal of group Ia or group IIa, or an active alloy of such metals, in finely divided or solution form in a continuous system and in the presence of one or more polymerization inhibitors. By the use of a continuous system, particularly in conjunction with the use of an inhibitor, the loss of styrene-type compound due to side reactions or to polymerization is very markedly reduced, or almost completely eliminated.

As pointed out previously, this is of particular importance in the case of styrene-type compounds which are quite susceptible to polymerization when placed in contact with certain active metals, as well as active alloys thereof. Thus, sodium is a very active catalyst for the polymerization of styrene-type compounds, and has been suggested as a catalyst for the conversion of styrene to resinous polymers in numerous references. The use of this material in very finely divided form in a continuous system for the refining of styrene-type compounds, therefore, must be carried out within well defined limits in order to prevent undue loss of styrene-type compounds due to polymerization. The success of the preferred refining method employing finely divided sodium, or other active metals, or alloys, must be attributed largely to the continuous nature of operation, resulting in a minimum contact time between the styrene-type compound and the reactant.

Although the process may be carried out in any desired manner, I prefer to conduct it in a vertical vessel or tower in which a certain height of a liquid suspension or solution of the active refining agent is maintained. The material to be refined then is passed upward in the vapor and/or liquid phase through this column of reagent at a rate sufficient to insure the removal of the desired quantity and type of impurities present at the temperature employed. The refined material preferably is taken off at the top in the vapor phase, temperature and pressure conditions being adjusted for this purpose.

Other methods of contacting the material to be treated and the refining agent also may be employed if desired. Thus, the unsaturated hydrocarbon may be passed through a horizontal treating unit, such as a pipe or bank of pipes, partially or completely filled with a suspension of the desired refining agent, or otherwise.

The suspending liquid employed for the refining agent may be of any desired type. Preferably, it does not react with the reagent or the material to be treated to any substantial extent, and preferably it does not introduce any additional impurities into the material to be treated. I find that hydrocarbons and hydrocarbon fractions are particularly desirable materials for use as suspending mediums for refining agents of the type described herein. Excellent results have been obtained by the use of aromatic hydrocarbons and aromatic hydrocarbon fractions for this purpose, particularly those having initial boiling points above 180° C. and more preferably above 200° C.

It is to be understood, of course, that the material to be treated may dissolve to some extent in the suspending medium, consequently the suspending medium actually employed in the operation of the process usually comprises a mixture of the material to be treated and the suspending medium initially introduced into the system.

The material being treated also may serve as a suspending medium for the refining agent without the addition of any other material, if desired.

Thus, a light oil styrene fraction may be introduced into the desired tower or vessel, together with the finely divided refining agent, after which the styrene fraction is passed into the suspension of the refining agent in the said styrene fraction at the desired temperature, the charging rate and more particularly the operating pressure being adjusted to maintain the treating agent at the desired level in the vessel.

It is to be understood, of course, that the portion of the material to be treated which has been dissolved in the suspending medium or which has been employed as the suspending medium in the substantial absence of other liquid materials, does not necessarily remain in the treating zone throughout the entire treating cycle. Rather, this material is in a state of dynamic equilibrium with the material being treated, a portion of it volatilizing continuously and being removed from the system, the material volatilized in this manner being replaced by the solution of a corresponding quantity of freshly added material to be treated. The major portion of the material to be treated, of course, passes upward through the suspending medium without dissolving therein.

The thickness of the layer of reagent through which the material to be treated is preferably passed depends upon a number of factors, such as the quantity and type of impurities present, the extent to which such impurities are to be removed, the type and degree of dispersion of the treating agent employed, the reaction temperature, the concentration of the treating agent in the suspending medium, and the like. In general, however, I prefer to employ a layer of reagent at least one foot thick and, more preferably, at least two feet thick. Excellent results are obtained by the use of a layer of reagent at least four feet thick.

It will be recognized that, other things being equal, the depth of reagent employed in the treating vessel controls the contact time between the material to be refined and the refining reagent.

The degree of dispersion of the treating agent also has a very profound effect upon the degree of refining obtained. In the case of sodium, I prefer to employ a subdivided mass in which at least the majority of the particles present have a diameter of not more than 0.05'' and, more preferably, not more than 0.03''. Excellent results are obtained when at least the majority of the particles present have a diameter of not more than 0.02''.

This subdivision may be carried out in any desired manner. Thus, in the case of sodium, a solution of this material in liquid amomnia may be introduced into an inert liquid, such as xylene, at room temperature or at elevated temperatures. The almost instantaneous volatilization of the ammonia present results in the dispersion of the sodium present in the xylene in an extremely finely divided state. Another method comprises spraying molten sodium into an inert liquid such as xylene or solvent naphtha. By suitable variations in the type and degree of fineness and/or dispersing ability of the spray nozzle employed, sodium of almost any desired degree of fineness may be obtained at will.

Another satisfactory method comprises melting the sodium under the surface of a suitable liquid, such as xylene, followed by violent agitation, such as with a turbo-mixer, and cooling with agitation. Other methods which may be used include extrusion through fine orifices, and the generation of an arc between sodium electrodes in an inert liquid.

Although almost any desired concentration of treating agent in the suspending medium may be employed, depending upon the type and concentration of the styrene-type compound, or fraction thereof, to be refined, the temperature, the depth of reagent employed, and the like, I generally prefer to employ a reagent containing less than 30%, and more particularly less than 20%, by weight of the treating agent. Excellent results are obtained when less than 15% by weight of the treating agent is suspended in the suspending medium.

It is to be understood, of course, that the term suspending medium refers to the actual suspending agent employed during the treating operation, and includes any of material being treated which may dissolve in such agent.

The concentration of the styrene-type compound to be treated also has a considerable influence upon the method of operating the process. Thus, with a highly concentrated styrene-type compound, such as 98% styrene, the reagent should preferably contain a fairly low concentration of active agent to minimize losses due to polymerization.

I generally prefer to employ a fraction of such concentration, and with such proportion of suspending medium, that the actual concentration of styrene-type compound in the reaction zone is less than 80%, and more preferably, less than 70%. Excellent results are obtained when the actual concentration of styrene-type compound in the reaction zone is less than 65%.

The concentration of styrene-type compound also may be reduced by the addition thereto of a suitable solvent, such as a hydrocarbon or hydrocarbon fraction, prior to introduction into the refining system.

The process may be carried out at any desired pressure, such as atmospheric, subatmospheric, and superatmospheric pressures.

In many cases, particularly when a styrene-type compound in a fairly highly concentrated form is refined with a suspension or solution of a finely divided active metal, or alloy, of the type described herein in a higher-boiling solvent, it is highly advantageous to conduct such operations at subatmospheric pressures, thereby reducing the concentration of styrene-type compound present in the refining system at a given reaction temperature. This serves to reduce the quantity of styrene-type compound converted to polymers in the process, consequently it is a preferred embodiment of this invention.

The temperature at which the process is conducted also has a very considerable bearing upon the degree to which the styrene-type compound is refined and the losses incured due to polymerization. Although the optimum reaction temperature to be employed is dependent largely upon other factors, such as the concentration of both the styrene-type compound and the refining agent in the reaction zone, I generally prefer to conduct the refining operations at temperatures below 100° C. and more particularly, below 85° C. Excellent results are obtained by conducting the refining operations at temperatures below 75° C.

The rate at which the material to be refined is passed through the reagent has a very considerable effect upon the degree to which the impurities present are removed, although this is dependent to some extent upon other variables such as the concentration of refining agent in the suspending medium and the temperature at which the refining operations are being conducted. While it is difficult to establish exact limits for optimum throughputs under all conditions, I generally prefer not to exceed a throughput of material to be treated on an hourly basis of more than four times the weight of suspending medium employed and more preferably not more than twice the weight of the suspending medium. Excellent results are obtained when not more than equal quantities of material to be treated, upon an hourly basis, are passed through the suspending medium.

It will be recognized that the contact time between the material to be treated and the reagent is determined both by the thickness of the layer of reagent employed and by the rate at which the material to be treated is passed through the reagent.

The method employed for introducing the material to be refined into the refining agent also has some influence upon the extent to which the styrene-type compound is refined. In general, it may be said that a fine stream or jet of the liquid or gaseous material to be refined is desired. This may be accomplished by introducing the material to be treated into the reagent by means of suitable orifices, jets, nozzles, or other subdividing means. Porous objects or materials also may be employed for this purpose, such as porous ceramic or glass diffusing blocks or units.

As the refining agent may show some tendency to settle out in the bottom of the treating vessel or unit, the jets or nozzles by means of which the material to be treated is introduced into the unit may be so arranged as to prevent any undue settling of this material. In vertical vessels, this may be accomplished by locating these units in such a way as to impinge the inlet stream or streams upon the bottom of the treating vessel. The inlet jets also may be aranged tangentially to impart a swirling or circular motion to the treating reagent, if desired. Another method comprises locating the inlet jet or jets directly in the bottom of the reactor, or tangentially in the sides of the reactor, or both, to prevent any settling in the bottom of the reacting vessel and/or to impart any desired circular or other motion to the treating medium.

Any desired combination of these methods also may be employed, such as the use of a jet or jets directly impinging upon the bottom of the reactor in conjunction with the use of a tangential jet or jets to prevent the active agent from settling out and depositing on the walls of the reactor and/or to maintain the reaction medium in any desired state of agitation.

The reaction medium also may be maintained in the desired degree of agitation by the use of suitable stirring or mixing devices, or by the use of circulating pumps, or by a combination of these methods, or otherwise. One or more of these methods also may be used in conjunction with one or more of the methods discussed previously to maintain the system in the desired degree of dispersion.

It should be pointed out, however, that the use of such agitation methods is not required in most cases. Thus, excellent results have been secured by conducting the refining operations in a tower, the material to be treated being introduced into the bottom of the tower by means of a small orifice. The passage of the fraction being treated in the gaseous state upward through the column was found to maintain the system in the desired degree of agitation.

The refining agent, particularly when finely divided sodium is employed for this purpose, usually acts both as a reactant and as a polymerizing agent for the removal of undesired impurities. Thus, in the case of light oil styrene fractions containing acetylenes, aldehydes, and other impurities, the sodium usually will react with at least a portion of the acetylenes present to form the corresponding sodium acetylides, and may react with certain of the oxygenated derivatives to form corresponding metallic derivatives. At least a portion of the acetylenic hydrocarbons present also are polymerized to form polymers, or copolymers with other unsaturated hydrocarbons present, which frequently are insoluble in nature. Certain of the oxygenated derivatives, such as aldehydes, also may be polymerized to form polymers which may be insoluble in type.

As a result, the refining of styrene-type compounds with a suspension of finely divided sodium is characterized by the gradual accumulation of insoluble polymers in the refining medium. This may be removed in any desired manner, such as by filtration, which may be carried out continuously during the refining operation, or may be carried out in a batchwise manner after the termination of the refining step.

As the removal of the insoluble polymers also is attended by some loss of refining agent, even when the latter is in a very fine state of subdivision, it is advisable in many cases to continue the refining operations until the refining agent has been largely or completely exhausted before filtering.

The solid or semi-solid filtered products may be treated to recover any desired materials or they may be disposed of in any suitable manner. Thus, any unchanged refining agent, such as sodium, may be recovered by melting and coalescing operations, or by amalgamation with mercury, or otherwise. Certain of the reaction products, such as sodium acetylides, may be decomposed with water to regenerate the corresponding acetylenes or they may be reacted with carbon dioxide to form unsaturated acids, or otherwise.

A convenient method for the disposal of the insoluble polymers comprises treatment with carbon dioxide, suitably in the presence of traces of moisture, followed by filtration.

As the cost of the treating process is largely a function of the quantity of the reactive agent employed in the refining operations, the efficient utilization of such agent is of considerable importance. A desirable method for insuring optimum utilization of the treating agent is to carry out the operations in a continuous countercurrent manner, the reagent moving through the system in a manner countercurrent to that of the material to be treated.

This may be illustrated by means of a consideration of a simple continuous countercurrent system comprising two treating towers or vessels. The material to be treated is passed into the first tower, which contains a partially exhausted reagent. This serves to remove a substantial portion of the impurities present, after which the partially refined material passes into the second tower, which contains a fresh, or more highly concentrated, reagent. This serves to remove the impurities present to the desired extent. The process is continued until the reagent in the first tower is almost, or completely exhausted, after which it is discarded and the partially exhausted reagent from the second column substituted for it. Fresh reagent then is added to the second column.

In this manner the material to be treated and the treating agent pass through the system countercurrent to each other, the first continuously and the second in a discontinuous manner.

This may be modified such as by the continuous addition of fresh reagent to the second tower, the continuous transfer of partially exhausted reagent to the first tower, and the continuous withdrawal of more completely exhausted, or exhausted, reagent from the first tower. A completely continuous countercurrent treating system thus is achieved.

Any desired modification of these methods may be employed, and any number of treating towers or units may be used. It will be observed that in each of the cases discussed, the incoming material to be refined is contacted with partially exhausted reagent (maximum concentration of impurities—minimum concentration of reagent), while the outgoing material to be refined is contacted with fresh or more highly concentrated reagent (minimum concentration of impurities—maximum concentration of reagent). Thus the two objectives to be sought, namely, practically complete, or complete, utilization of the reagent and substantial, or practically complete, removal of impurities from the material to be refined, are achieved.

As the limiting factor affecting the utilization of the reagent is the proportion of insoluble polymers and/or residues which can be contained therein without seriously impairing its flowing properties, or the passage of the gaseous material to be treated therethrough, it frequently happens that the quantity of insoluble material present is insufficient to interfere seriously with the operation of the process when the refining agent present has been almost completely exhausted. In this case, the operation of the unit may be continued by the addition thereto of an additional quantity of the refining agent, and this process may be continued until the concentration of insoluble material in the reagent renders it too viscous to be used further in the process in a satisfactory manner.

In this connection, it is well to point out that the insoluble products formed during the reaction have a tendency to stabilize the sodium suspension and act to reduce the rate of settling of the finely divided sodium in certain cases. As this is desirable, the incomplete removal of insoluble products from the reagent may be indicated, or even the addition of a certain quantity of such materials to a fresh reagent.

Soluble polymers also usually are formed in small amounts during the refining operations. As certain of these soluble and/or liquid polymers may be converted on prolonged contact with the refining agent to viscous and/or insoluble products, their removal from the suspending medium, suitably at the end of a refining cycle and prior to the return of the suspending agent to the system, may be indicated. On the other hand, certain of these soluble polymers are sufficiently stable to act as a suspending medium for the refining agent.

The process may be more completely illustrated by means of the following example.

*Example*

A 60% light oil styrene fraction containing 0.2% phenylacetylene and 0.02% aldehydes, was passed continuously into the bottom of a 2" steel column containing very finely divided sodium suspended in a mixture of amyl-substituted naphthalenes at a temperature of 60° C. The operation was carried out under reduced pressure, which was adjusted to maintain the treating mixture at the desired level. The refined styrene fraction obtained as a result of such operations was water-white and was substantially free of phenylacetylene, aldehydes, and other impurities.

The impurities present, particularly the acetylenes and the aldehydes, were converted both to sodium derivatives and to insoluble polymers.

In the specification and in the claims, the following terms have the indicated meanings.

The term "metals of group Ia and group IIa of the periodic system" is intended to mean lithium, sodium, potassium, rubidium, caesium, barium, strontium, and calcium, as well as active alloys containing one or more of such metals as an essential ingredient.

The term "finely divided" is intended to mean a material reduced to such a state of fineness that the preponderating part is composed of particles having a diameter of less than 0.05", as well as materials in the colloidal or dissolved form.

While reagents and procedures of a particular nature have been specifically described, it is to be understood that these are given by way of illustration. Therefore, changes, omissions, additions, substitutions, and/or modifications may be made within the scope of the claims without departing from the spirit of the invention, which is intended to be limited only as required by the prior art.

I claim:

1. A process for refining a hydrocarbon selected from the group consisting of styrene and methyl styrene and contained in a hydrocarbon mixture which also contains impurity including acetylenic material, comprising passing said mixture at a temperature below 100° C. through a dispersion of a finely divided metal selected from the group consisting of metals of group Ia and group IIa of the periodic system, said dispersion being at least one foot in thickness in the direction of flow of said mixture and containing less than 30% by weight of said finely divided metal, maintaining the concentration of said selected hydrocarbon in the reaction zone less than 80% by weight of the total material present, while maintaining the rate of flow per hour of said mixture through said dispersion less than four times the weight of dispersion medium employed, and removing said mixture less contaminated with impurity including acetylenic material from said reaction zone sufficiently rapidly to prevent a large loss of said selected hydrocarbon due to the polymerization thereof.

2. A process for refining styrene contained in admixture with impurity including acetylenic material in a light oil styrene fraction, which comprises passing said fraction at a temperature below 75° C. through a dispersion of a finely divided alkali metal, said dispersion containing less than 20% by weight thereof of said finely divided metal and being at least two feet in thickness in the direction of flow of said fraction, maintaining the concentration of said styrene in the reaction zone less than 65% by weight of the total material present, while maintaining a rate of flow per hour of said fraction through said dispersion of less than four times the weight of dispersion medium employed, and removing said styrene fraction less contaminated with impurity including acetylenic material from said reaction zone sufficiently rapidly to prevent a large loss of said styrene due to polymerization thereof.

3. A process for refining methyl styrene contained in admixture with impurity including acetylenic material in a light oil methyl styrene fraction, which comprises passing said fraction at a temperature below 75° C. through a dispersion of a finely divided alkali metal, said dispersion containing less than 20% by weight thereof of said finely divided metal and being at least two feet in thickness in the direction of flow of said fraction, maintaining the concentration of said methyl styrene in the reaction zone less than 65% by weight of the total material present, while maintaining a rate of flow per hour of said fraction through said dispersion of less than four times the weight of dispersion medium employed, and removing said methyl styrene fraction less contaminated with impurity including acetylenic material from said reaction zone sufficiently rapidly to prevent a large loss of said methyl styrene due to polymerization thereof.

4. A process for refining styrene contained in a hydrocarbon mixture contaminated with impurity including acetylenic material, which comprises passing said mixture under temperature conditions below 100° C. through a dispersion of a finely divided alkali metal, said dispersion containing less than 30% by weight thereof of said finely divided metal and being at least one foot in thickness in the direction of flow of said mixture, maintaining the concentration of said styrene in the reaction zone less than 65% by weight of the total material present, while maintaining the rate of flow per hour of said mixture through said dispersion at less than four times the weight of dispersion medium employed, and removing said styrene in vapor phase less contaminated with impurity including acetylenic material from said reaction zone sufficiently rapidly to prevent a large loss of said styrene due to polymerization thereof.

5. A process for refining methyl styrene contained in a hydrocarbon mixture contaminated with impurity including acetylenic material, which comprises passing said mixture under temperature conditions below 100° C. through a dispersion of a finely divided alkali metal, said dispersion containing less than 30% by weight thereof of said finely divided metal and being at least one foot in thickness in the direction of flow of said mixture, maintaining the concentration of said methyl styrene in the reaction zone less than 65% by weight of the total material present, while maintaining the rate of flow per hour of said mixture through said dispersion at less than four times the weight of dispersion medium employed, and removing said methyl styrene in vapor phase less contaminated with impurity including acetylenic material from said reaction zone sufficiently rapidly to prevent a large loss of said methyl styrene due to polymerization thereof.

6. A process for the purification of styrene contained in admixture with impurity including acetylenic material, which comprises passing said admixture at a temperature below 85° C. through a dispersion of finely divided sodium, said dispersion being at least one foot in thickness in the direction of flow of said admixture and containing less than 30% by weight thereof of said finely divided sodium, maintaining the concentration of said styrene in the reaction zone less than 65% by weight of the total material present, while maintaining the rate of flow per hour of said admixture through said dispersion at less than four times the weight of dispersion medium employed, and removing styrene less contaminated with impurity including acetylenic material from said reaction zone sufficiently rapidly to prevent a large loss of said styrene due to polymerization thereof.

7. A process for the purification of methyl styrene contained in admixture with impurity including acetylenic material, which comprises passing said admixture at a temperature below 85° C. through a dispersion of finely divided sodium, said dispersion being at least one foot in thickness in the direction of flow of said admixture and containing less than 30% by weight thereof of said finely divided sodium, maintaining the concentration of said methyl styrene in the reaction zone less than 65% by weight of the total material present, while maintaining the rate of flow per hour of said admixture through said dispersion at less than four times the weight of dispersion medium employed, and removing methyl styrene less contaminated with impurity including acetylenic material from said reaction zone sufficiently rapidly to prevent a large loss of said methyl styrene due to polymerization thereof.

FRANK J. SODAY.